(No Model.)
S. CHAMBERS.
FRUIT GATHERER AND PRUNING IMPLEMENT.
No. 498,620.　　　　　Patented May 30, 1893.
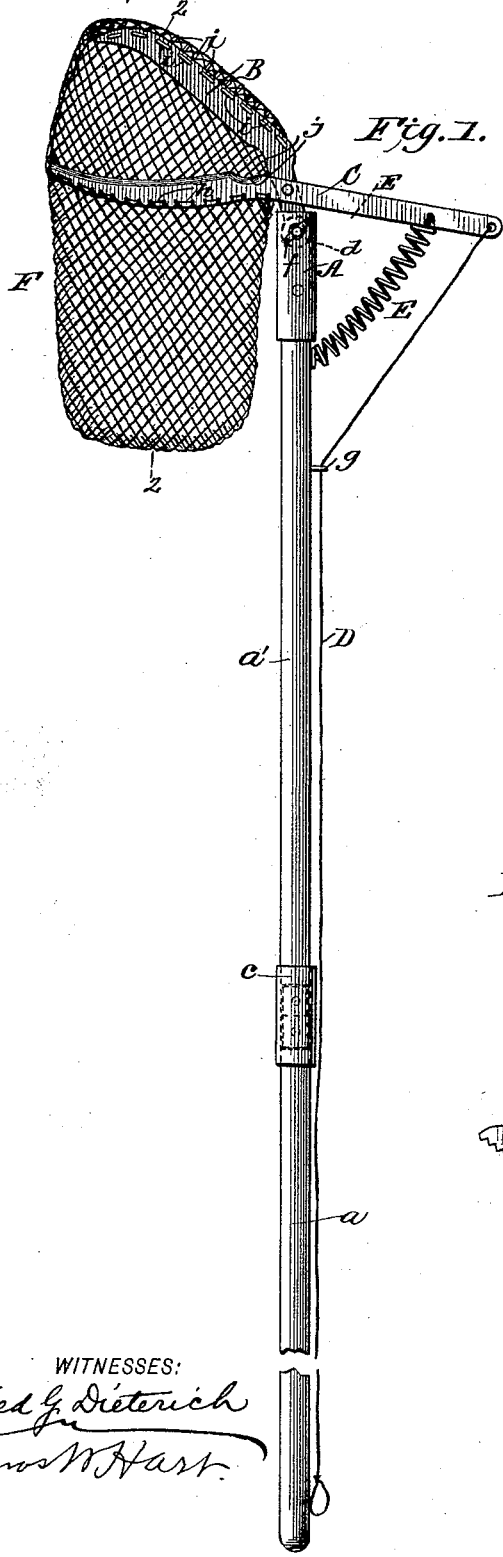
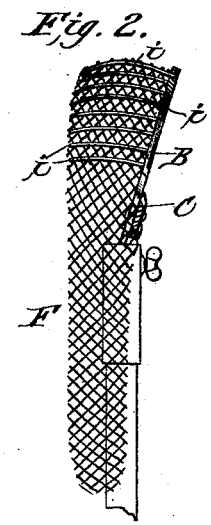
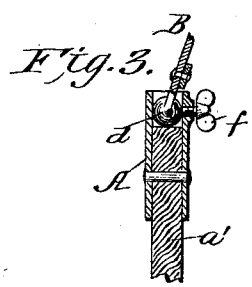
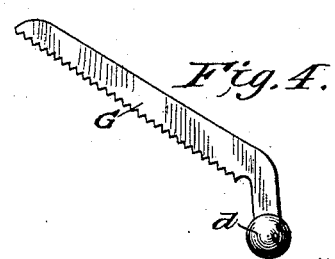
WITNESSES:
Fred G. Dieterich
Amos W. Hart
INVENTOR
Silas Chambers.
BY Munn & Co
ATTORNEYS.

UNITED STATES PATENT OFFICE.

SILAS CHAMBERS, OF WACO, TEXAS.

FRUIT-GATHERER AND PRUNING IMPLEMENT.

SPECIFICATION forming part of Letters Patent No. 498,620, dated May 30, 1893.

Application filed October 29, 1892. Serial No. 450,315. (No model.)

*To all whom it may concern:*

Be it known that I, SILAS CHAMBERS, residing at Waco, in the county of McLennan and State of Texas, have invented a new and Improved Fruit-Gatherer and Pruning Implement, of which the following is a specification.

My invention is an improvement in that class of fruit-gatherers having a pair of shears and a bag, or fruit-receptacle, attached to a long wooden handle, one blade of such shears being operated by a rod or cord for severing the stems of fruit which then drops into the bag. By detaching the latter, the implement may be used for pruning, and, in case the tree limbs required to be severed are too thick to allow use of the shears, they are detached and a saw is substituted, it being attached to the handle in the same manner as the shears. The construction and combination of parts whereby I provide for this substitution and also for changing the angle of the fixed shear blade or the saw to the handle, and whereby the bag is better adapted to receive or catch the severed fruit, constitute the main features of my invention.

Figure 1 is a side view of the implement. Fig. 2 is a detail side view showing the means for supporting the bag. Fig. 3 is a longitudinal section showing the attachment of the fixed blade to the handle. Fig. 4 is a side view of a saw blade that may be used in connection with the handle.

The handle of the implement is formed of two or more parts $a$ $a'$ jointed together to permit folding for convenience of transportation or storage. This joint is formed (see Fig. 1) by means of a metal plate and cylindrical sleeve $c$, the plate being inserted and pivoted in slots in the adjacent ends of the handle portions, and a sliding sleeve $c$ being adapted for adjustment on the handle to cover or uncover the joint, as required. An iron or steel socket piece A, is fixed on the upper end of the handle, and to this the fixed obtuse-angled shear blade B is attached, the straight movable and longer blade C being pivoted to the other, as shown. The fixed blade is set in a plane parallel or nearly so with the handle, but projects laterally at a slight angle. The end of its shank has a spherical enlargement $d$, which fits somewhat loosely in the end of the socket piece A, and a pointed clamp-screw $f$ is arranged in a screw-threaded hole of the socket piece, and by engagement of its point with the indentations in the shank of the fixed blade B, the latter may be secured at any desired angle. This angle is varied according to the location of the fruit to be gathered. The movable blade C, is arranged, normally, at nearly a right angle to the handle $a$ $a'$ and pivoted, at or near the middle of its length, to the shank of the fixed blade B. A cord, D, is attached to the end of the shank of the pivoted blade, C, and runs through guides, $g$, on the handle $a'$. Spring E is arranged to assist in holding the shear blades open. For this purpose it is arranged in diagonal position between the handle $a'$ and movable blade C, and attached to both.

The bag F, constituting the fruit receptacle, is preferably made of netting in order that the operator may see the fruit through its meshes and thus ascertain when it is full. It is secured to the shear blades by means of lacing cords $h$, which are wove through holes formed in the rear edges of the blades and through the top interstices of the netting. It is apparent that if the operator so manipulates the implement that the shear blades embrace a stem supporting a pendent fruit, as shown in Fig. 1, and then pulls the cord D, the movable blade, C, will close upon the other, B, and thus sever the stem, when the fruit necessarily falls into the bag.

In order that the upper side of the mouth of the bag may project from the fixed blade as shown in Fig. 2, instead of lying flat against said blade as it would otherwise do, I provide means for holding the upper portion of the bag open or distended. The preferred means is a series of wires, $i$, which project laterally, as shown, and are secured to the fixed blade, B, by inserting their ends in holes and clamping them over the back of the blade. Their opposite ends are free, and curved downward, so that the bag rests on them and is thus held distended. When it is desired to use the implement for pruning, the lacing cords $h$ are withdrawn and the bag F detached.

I provide the shear blades with notches $j$, at the rear extremities of their cutting edges, to adapt them to hold thick tree limbs close to fulcrum point where the leverage is greatest. When the limbs to be severed are too thick to allow use of the shears A B, they are detached and a saw blade G, (see Fig. 4) is substituted. The saw shank has an enlarged head similar to that on the fixed shear blade, and is similarly attached to the handle $a\ a'$, and may be similarly adjusted at different angles.

Having thus described my invention, what I claim is—

1. In a fruit-gatherer, the combination, with the handle socket and clamp-screw working in one side of the same, of the cutters, or blades, one of which has a spherical extremity adapted to fit loosely in said socket, as shown and described, whereby the blades may be adjusted and secured at any desired inclination to the handle, as specified.

2. In a fruit gatherer, the combination, with blades pivoted together, one below the other, and the fruit-receiving bag, attached to them as specified, of the laterally-projecting wires inserted in holes in the upper blades, their outer ends being free or unattached, as shown and described.

SILAS CHAMBERS.

Witnesses:
P. P. ALLEN,
W. A. SNODGRASS.